(12) United States Patent
de Smet

(10) Patent No.: US 8,989,897 B2
(45) Date of Patent: Mar. 24, 2015

(54) ROBOT-CELL CALIBRATION

(75) Inventor: Pierre de Smet, Bloomfield Hills, MI (US)

(73) Assignee: Dynalog, Inc., Bloomfield Hills, MI (US)

( * ) Notice: Subject to any disclaimer, the term of this patent is extended or adjusted under 35 U.S.C. 154(b) by 1651 days.

(21) Appl. No.: 11/719,682

(22) PCT Filed: Nov. 18, 2005

(86) PCT No.: PCT/US2005/041805
§ 371 (c)(1),
(2), (4) Date: May 18, 2007

(87) PCT Pub. No.: WO2006/055770
PCT Pub. Date: May 26, 2006

(65) Prior Publication Data
US 2009/0157226 A1    Jun. 18, 2009

Related U.S. Application Data

(60) Provisional application No. 60/629,359, filed on Nov. 19, 2004.

(51) Int. Cl.
*G12B 13/00*    (2006.01)
*G06F 19/00*    (2011.01)
*B25J 9/16*     (2006.01)
*G01B 11/14*    (2006.01)
*G01B 11/00*    (2006.01)

(52) U.S. Cl.
CPC .......... *B25J 9/1692* (2013.01); *G01B 11/002* (2013.01); *G05B 2219/37275* (2013.01); *Y10S 901/02* (2013.01); *Y10S 901/50* (2013.01)
USPC .................. 700/245; 356/614; 901/2; 901/50

(58) Field of Classification Search
USPC .................. 700/245, 254; 356/614; 901/2, 50
See application file for complete search history.

(56) References Cited

U.S. PATENT DOCUMENTS

| | | | |
|---|---|---|---|
| 4,988,200 A * | 1/1991 | Cohen-Sabban | 356/601 |
| 5,957,933 A | 9/1999 | Yanof et al. | |
| 6,044,308 A * | 3/2000 | Huissoon | 700/166 |
| 6,321,137 B1 * | 11/2001 | De Smet | 700/245 |
| 6,408,252 B1 * | 6/2002 | De Smet | 702/94 |
| 6,434,449 B1 * | 8/2002 | De Smet | 700/254 |
| 6,529,852 B2 * | 3/2003 | Knoll et al. | 702/150 |
| 7,800,758 B1 * | 9/2010 | Bridges et al. | 356/482 |
| 2002/0008870 A1 * | 1/2002 | Beliveau et al. | 356/152.1 |
| 2004/0012363 A1 | 1/2004 | Simondet | |

* cited by examiner

*Primary Examiner* — John Q Nguyen
*Assistant Examiner* — Kyung Kim
(74) *Attorney, Agent, or Firm* — Gifford, Krass, Sprinkle, Anderson & Citkowski, P.C.

(57) ABSTRACT

A calibration system for a robot and its peripheral includes an emitter attached to the robot or its peripheral and emits a laser beam and a receiver also mounted to the robot or its peripheral at a point to permit calibration and for receiving the laser beam and to permit calculations to determine the dimension between the emitter and the receiver.

13 Claims, 7 Drawing Sheets

ROBOT-CELL CALIBRATION

RELATED APPLICATION

This application claims priority of U.S. Provisional Patent Application Ser. No. 60/629,359 filed Nov. 19, 2004, which is incorporated herein by reference.

BACKGROUND OF THE INVENTION

The present invention relates to calibration of a standard industrial robot, as well as of most its peripherals (i.e. end-effector, fixture, etc.). More specifically, it is based on the use of a small-range measurement device, paired with a virtual extension (typically mounted on the robot). Compared to the current technology, the present solution is very portable, cost-effective and highly practical, while at the same time inherently maximizing the accuracy of the calibration process.

DESCRIPTION OF THE PRIOR ART

There are a variety of solutions currently used to perform calibration of a typical industrial robot, and optionally of some of its peripherals as well (e.g. end-effector or fixture). The vast majority of these solutions are based on the use of a large-range external measurement device (e.g. laser tracker, opto-mechanical measuring cable, photogrammetry, etc.), allowing the robot to be measured at or close to its end-effector's Tool Center Point (TCP) within a substantial portion of its envelope.

A robot's position (6DOF) in space is mathematically characterized by a series of parameters defining its "kinematic model". Due to inherent manufacturing tolerances, all robots are manufactured slightly differently from one another. As a result, a single "nominal" kinematic model will not accurately represent the position of each individual robot. Instead, more accurate positioning in space is achieved by performing robot calibration on each individual robot. Generally then, robot calibration refers to the process of identifying—and then correcting for—as accurately as possible the "actual" parameters of a robot's kinematic model. The identification process itself generally relies on the comparison of a series of actual robot points in space with its corresponding series of precision measurements. There is extensive literature available covering the topic of robot calibration (see "An Overview of Robot Calibration", Z. S. Roth (Paper, 1987); "Fundamentals of Manipulator Calibration", B. Mooring (Book, 1991); "Robot Calibration", R. Bernhardt (Book, 1993)).

However, calibration of the robot only resolves a portion of the problem. Indeed, other mechanisms within a robot-cell contribute to the overall positional accuracy of any robot application. For example, the end-effector mounted on the robot's flange might be inaccurate; or the fixture holding a specific part might not be precisely located relative to the robot; or the multi-axis positioner operating together with the robot might be un-calibrated; etc. Therefore, from a practical point of view, a complete robot-cell calibration solution is required, guaranteeing, for example, the desired tip of a given end-effector mounted on the robot to be positioned as precisely as possible relative to the part located in a fixture on which the robot is operating.

Traditionally, large-range 3D or 6D measurement systems (e.g. laser trackers or theodolites) are used primarily to calibrate the robot itself, either at the robot manufacturer's site or at the end-user's facility. The one or multiple required measurement targets are then mounted on a tool itself rigidly connected to the robot's flange. There are various approaches to calibrate the robot from there (e.g. global vs. axis-per-axis calibration), but in any case all of these methods require the utilized measurement system to provide high accuracy over the entire envelope of the robot being measured.

The use of such large-range measurement devices to also calibrate a robot's peripherals poses several disadvantages. Indeed, calibration of peripherals must, by definition, occur at the end-user's facility. This in turn raises the issue of transporting bulky measurement equipment. Furthermore, such large-scale high-accuracy measurement systems are intrinsically too expensive to acquire for most robot end-users. Finally, most of these high-end measurement devices require delicate operation, often involving a lengthy setup time (if only for heating temperature to stabilize) and necessitating highly qualified operators.

In consideration of some of the disadvantages associated with large-scale measurement-based calibration solutions, several other solutions have been utilized. Some of these solutions still use some sort of large-range measurement device but in a simplified form (therefore typically less expensive and less bulky), e.g. a "linear scale" (see "A New Method for Kinematic Parameter Calibration via Laser Line Tracking", Wyatt Newman (Paper, 1993)) or a measurement cable (e.g. the DynaCal™ product patented by the present Author). The DynaCal system for example has been widely accepted as a practical solution in the robotic industry worldwide.

The DynaCal system uses a 1D measurement cable wound around a precisely monitored drum allowing for a cable extension of up to 3 m with an accuracy of up to 0.15 mm. It operates on a similar principal as traditional large-range 3D or 6D measurement-based solutions (although in one dimension only), offering high calibration accuracy but at a substantially lower cost and in a much more convenient package. It is thus routinely used for calibration of robots and their peripherals either at a robot manufacturer's facility or at a robot end-user's plant. However, one of the negatives of the DynaCal system is the potential interference between its measurement cable and its surroundings, therefore sometimes complicating the location of the DynaCal unit within a typical fixture.

Other calibration attempts move away entirely from requiring a large-range measurement, even in a more simplified form. Instead, measurement of the robot is performed in a small volume only, therefore typically requiring a much simpler, smaller and less expensive small-range measurement device. However, accurate Identification of the various kinematic parameters inherently requires motion of the robot in a substantial portion of its entire envelope (therefore traditionally requiring a large-range measurement system) in order to exercise all of the parameters sufficiently so that they can be mathematically differentiated from one another.

The use of a small-range measurement device instead, obviously limits the motion of the robot within a small volume. However, some exercise of the parameters to be calibrated is obtained by changing the robot's orientation in multiple directions, while still maintaining the measured target within the limited envelope of the small-range measurement device. Logically, the larger the distance between the measurement target and the robot's flange, the more the robot parameters will be exercised, and therefore the better the robot can be calibrated.

In fact, the most primitive calibration solution is based on no measurement device at all, other than a point in space (essentially a "zero-range" measurement device at virtually no cost). In that case, the operator is forced to manually teach the robot such that a given target point on the robot (e.g. the intended TCP) meets a static point in space (a pointer) with multiple orientations. This particular method not only suffers from the drawback mentioned above (i.e. limited parameter exercise resulting in poor accuracy), but additionally it is very time-consuming and highly prone to manual teaching errors, all that therefore dramatically reducing the practical use and effectiveness of this method.

An evolution of the above solution is to use an electric contact. Compared to the manual method described in the previous section, use of an electric contact (typically between a location close by the TCP and a fixed location in space) allows the calibration process to be automated. The robot can stop as soon as contact is established, while the current robot position is recorded. However, this method, although automatic, is slow since the robot is required to move at low speed in order to make contact at a position in space that can be reliably recorded. More importantly, as explained above, this method does not allow enough exercise of most of the kinematic parameters to allow for full calibration of the robot. Nonetheless, due primarily to the intrinsically low cost of this method, several electric contact-based calibration solutions are currently in use in the industry (see "TorchMate" from Fanuc Robotics America), mostly for basic calibration (or re-calibration) only though (e.g. TCP only).

A further step is to use a series of simple small-range one-dimensional sensors generally orthogonally mounted to one another. Several solutions have been proposed using dial gauges or LVDT's (see "A Sensor User for the Measurement in the Calibration of Production Robots", Louis Everett (Paper 1996)). A more recent solution consists of three standard orthogonally mounted small-range one-dimensional laser distance sensors, arranged to measure a sphere mounted on the robot within a limited measurement range (see "3D Laser-Lab" from Wiest AG). One obvious disadvantage of this solution is the high likelihood of the sphere colliding with the measurement device while the robot is re-oriented (due to the starting inaccuracy of the robot, which is precisely what is to be calibrated for). Furthermore, as explained above, the only way to get enough exercise of the robot parameters is to use extension rods of different lengths at the end of which a sphere is mounted, rendering that solution practically inconvenient and therefore realistically inaccurate.

Another current calibration solution ("ROSY" from Teconsult) is still based on a small-range measurement device, but this time the position of the measurement device and that of each one of the measured targets are essentially reversed. Indeed, the measurement device consisting of two stereoscopic cameras is mounted on the robot, and the viewed target(s) are fixed on the fixture or elsewhere in the robot envelope. The use of multiple targets spread within the robot envelope allows for a wider exercise for the robot parameters. However, the measurement device to be mounted on the robot is rather bulky, practically thus involving removal of the end-effector from the robot. Furthermore, it requires the necessary cabling to be run along the robot mechanism. Consequently, this solution is difficult to use at an end-user's facility where calibration of the actual TCP is often critical.

However, a similar setup has now become a standard industrial solution in a very specific robot application—generally referred to as "Flexible Measurement System (FMS)"—where the sensor mounted on the robot (a 3D camera/laser setup or any other sensor with one or more degrees of freedom) is used for calibration purposes, in a similar manner as explained above. In this particular robot application though, the sensor mounted on the robot is the end-effector (so the sensor's calibrated location defines the desired TCP), and is thus a part of the robot application it being used for general inspection applications (e.g. measuring the location of various features on the part), while the calibration process is performed periodically on-line (thus using the very same sensor that is used for inspection), therefore continuously guaranteeing the highest possible performance (see Applicant's U.S. Pat. No. 6,321,137 B1).

Another small-range calibration solution (see French Patent # FR 2 696 969-A1) is based on the use of camera viewing a small plate fixed in space at which a laser beam mounted on the robot is pointing. The use of a laser beam in conjunction with the camera essentially provides for a "virtual extension" of multiple lengths, therefore providing—as explained above—quite some exercise of the kinematic parameters without the need for unpractical mechanical extensions. However, this invention does not address any of the practical issues challenging calibration on the plant floor, barely touching on the issue of end-effector calibration and not providing any solution at all for fixture calibration. In fact, Applicant is not aware of any industrial application of this invention.

Another patent (see U.S. Pat. No. 6,529,852) addresses primarily some theoretical issues related to the use of small-range measurement devices in a broad sense for robot calibration. More specifically, it proposes a general method to mathematically define an appropriate set of robot positions to be measured for calibration purposes, therefore attempting to eliminate any unnecessary or redundant calibration points. It also proposes a solution to address the issue of scaling inherent to any small-range measurement-based calibration solution. Here also though, practical implementation issues faced in an actual industrial environment are not addressed, e.g. how to conveniently calibrate the end-effector and the fixture, or how to calibrate for fixed TCP applications (where a gripper is mounted on the robot), etc.

SUMMARY OF THE PRESENT INVENTION

The present invention proposes a robot cell calibration solution based on a practical small-range measurement device, addressing actual implementation issues faced in any industrial environment. The solution proposed herein is therefore not only cost-effective and easy to transport, but it also offers a convenient solution for full robot cell calibration in an industrial setting where overall accuracy of the robotic application is required, therefore involving calibration of the robot as well as its peripherals (e.g. end-effector, fixture, fixed TCP, positioner, etc.).

In the primary embodiment, the small-range measurement device essentially consists of two main components, i.e. a receiver and an emitter. The emitter—generally attached at the end of the robot—is made of two perpendicular laser planes, resulting in the projection of a cross on any intersecting surface. The receiver consists of a series of linear array sensors arranged within a plane in such a way that a 2D measurement is obtained when hit by the emitter.

Generally speaking, the emitter is built such that it can be located easily at the intended TCP on the end-effector mounted on the robot while allowing precise calibration of that TCP. Similarly, the receiver can conveniently be mounted with respect to known features on the fixture, the relation of which to the robot needs to be calibrated. This standard setup can easily be re-arranged depending on the specific robotic application, as will be described in more detail below.

More specifically, the receiver also includes a laser beam pointing away from the measurement plane. This beam, providing a critical additional dimension, can be used for several purposes, depending on the particular robotic application. First of all, in a typical application it serves, as explained in further details below, to appropriately align the receiver relative to the robot, which in turn is critical for proper calibration of the fixture—or a multi-axis positioner—relative to the robot. In so-called "Fixed TCP" applications (where the end-effector mounted to the robot is actually a 6DOF gripper), the laser beam on the receiver can actively be used to calibrate the gripper's TCP.

The two laser planes of the emitter intersect to from a single laser line. The mechanism used for the emitter assembly is such that the laser line can easily and repeatedly be rotated around a single intersecting point, mechanically made to coincide with the desired TCP of the end-effector. Different robotic applications require different configurations of the emitter though, as further detailed below, e.g. where only one laser line is required, or where multiple laser lines don't need to be intersecting, etc.

The present invention can cover a wide variety of standard robot cell calibration needs. The general term of "Robot-Cell Calibration" indeed addresses different levels of calibration. "Absolute Accuracy" Calibration refers to the concept of making the robot-cell as accurate as possible relative to the "true" world (i.e. making sure, for example, the robot moves truly one meter when programmed to do so). Absolute Accuracy Calibration of a robot-cell is typically done once only and in a manual mode either at the robot manufacturer's facility, or at the launch of a new product line at the end-user's plant. As will be described further below, the present invention is ideally suited for Absolute Accuracy Calibration applications.

Another type of calibration is for recovery: the robot cell needs to be re-calibrated after some change might have occurred (e.g. the end-effector having "crashed", or a motor on the robot needing replacement, etc.). In that case, all that matters is to make sure that the robot moves in space as closely as it did prior to the change (i.e. if a robot programmed, for example, to move 1 meter actually moved 0.9 meter, it should move 0.9 meter again after recovery). Since unwanted changes in the robot cell can typically occur at any time during production, any recovery calibration procedure should preferably be automatic: in this application a very attractive solution is provided.

There are of course other types of calibrations as well (e.g. temperature compensation), but another important aspect of the present invention, as identified above, is the ability to run the calibration as easily in a manual mode as in an automatic mode. Indeed, whenever needed, both the one or more emitters and receivers can be mounted permanently on the robot and on the fixture or positioner, easily allowing therefore for a pre-recorded calibration program to be run automatically during production.

Finally, the present invention comes with a comprehensive and well-proven software package (an extension from the software developed for the DynaCal system, patented by Applicant). It offers a convenient way to perform the Identification process with measurement data obtained with the small-range measurement device described above, for a variety of commercially available industrial robots. It also provides the ability to compensate the robot for the calibrated parameters (either through "Filtering" or through "Direct Entry"). The software package that's part of the present invention offers many additional tools that have already proven their usefulness as part of the DynaCal product.

DESCRIPTION OF THE DRAWINGS

A better understanding of the present invention will be had by referring to the accompanying drawings in which.

DESCRIPTION OF A PREFERRED
EMBODIMENT OF THE PRESENT INVENTION

The method and apparatus of the present invention will be described in conjunction with the drawings. It will be understood, however, that the method of the present invention will have applications in other areas of manufacturing and that the description of the present invention with respect to the described embodiments is by way of example only.

Figure 1:
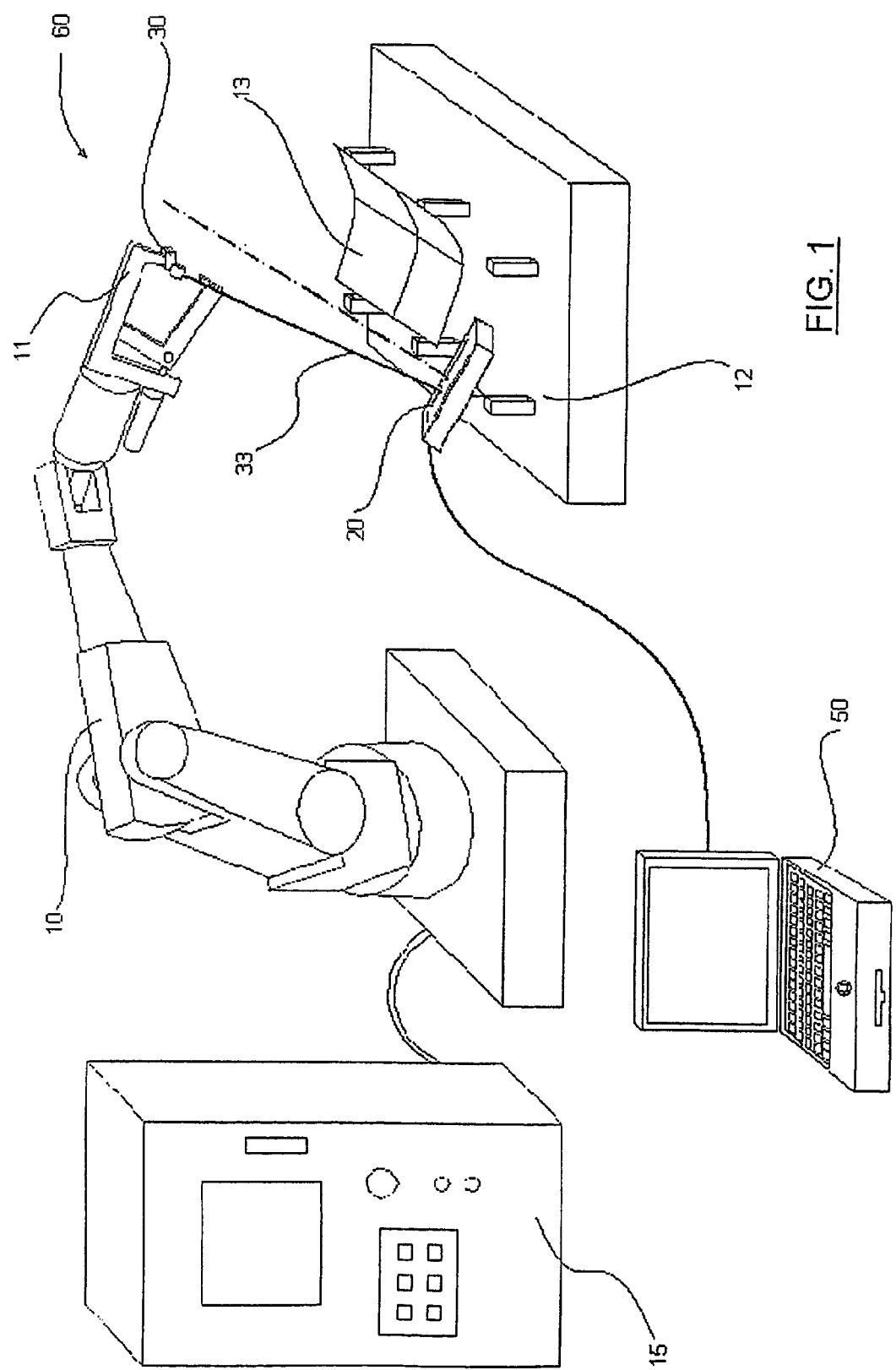
FIG. 1 is a diagrammatic representation of the present invention within a typical robot cell configuration.

The calibration system 60 of the present invention is shown generally in FIG. 1 as used to perform calibration of an industrial robot 10 connected to a robot controller 15. The robot 10 would typically include an end-effector 11 which might be a tool or some other device rigidly connected to and manipulated by the robot 10. Typically, a fixture 12 holding a part 13 sits in front of the robot 10 that is performing a specific task on the part 13 (e.g. arc welding or laser cutting).

Figure 2:
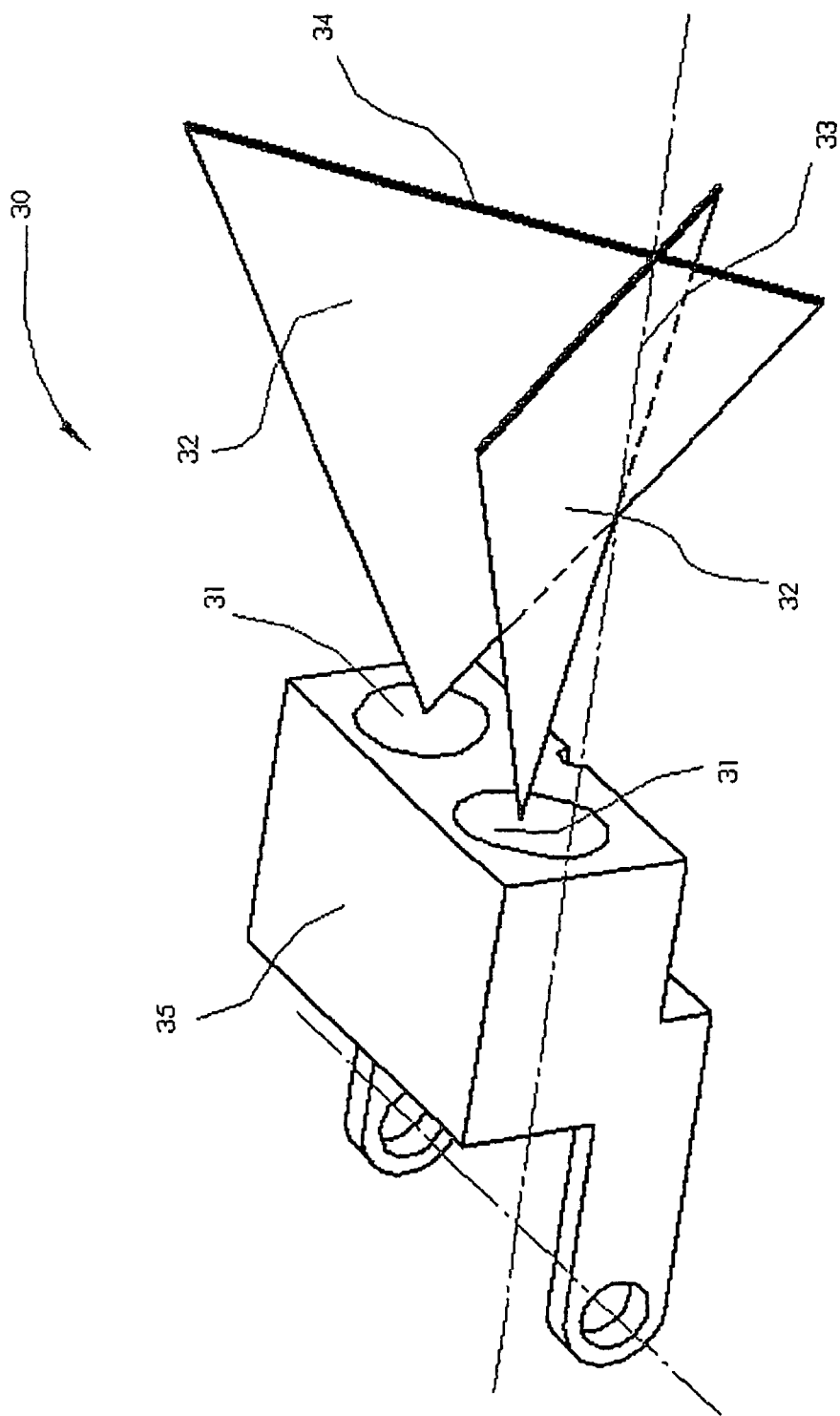
FIG. 2 is a more detailed drawing of the laser arrangement in the emitter, a component of the small-range measurement device that is part of the present invention.
Figure 3:
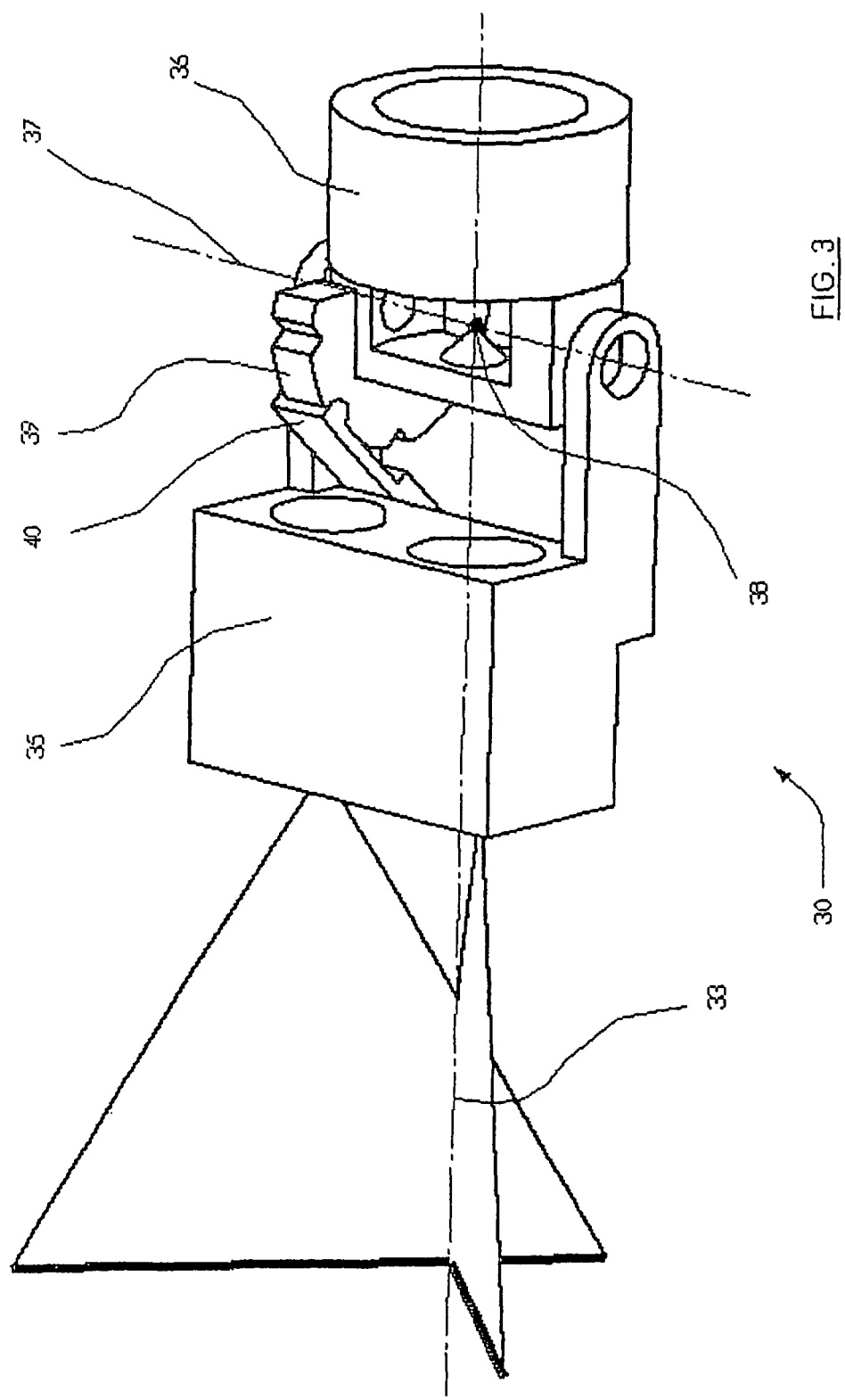
FIG. 3 is a more detailed drawing of the mechanism of the emitter, a component of the small-range measurement device that is part of the present invention.

The calibration system 60 consists primarily of two components: an emitter 30 and a receiver 20. The emitter 30 (see FIG. 2 and FIG. 3) generally consists of two lasers 31, each one emitting a laser plane 32. The lasers, 31, are mounted in the emitter 30 in such a way that the emitted planes 32 intersect one another at roughly 90 degrees, thus forming an imaginary laser line 33. Therefore, when projected on a flat surface, the two lasers 31 will produce a laser cross, 34; however, depending on the angle at which the laser line 33 hits that surface both legs of the resulting cross 34 might not be orthogonal to one another.

The "Tool Center Point" (TCP) 38 is the point of interest on the end-effector 11 that the robot 10 is supposed to move precisely in space in order to perform a specific operation on a part (e.g. the tip of a spot weld gun needs to be accurately positioned along the edge of a car door panel). Therefore, unless the TCP of a specific end-effector 11 is known in advance, it typically needs to be calibrated. Hence, the mechanical arrangement of the emitter 30 allows for the orientation of the virtual laser line 33 to be conveniently modified over a wide range of angles while still intersecting at the intended TCP 38. That way, by having at least two different orientations of the laser line 33 the intended TCP, 38 can be readily calibrated.

Figure 4:
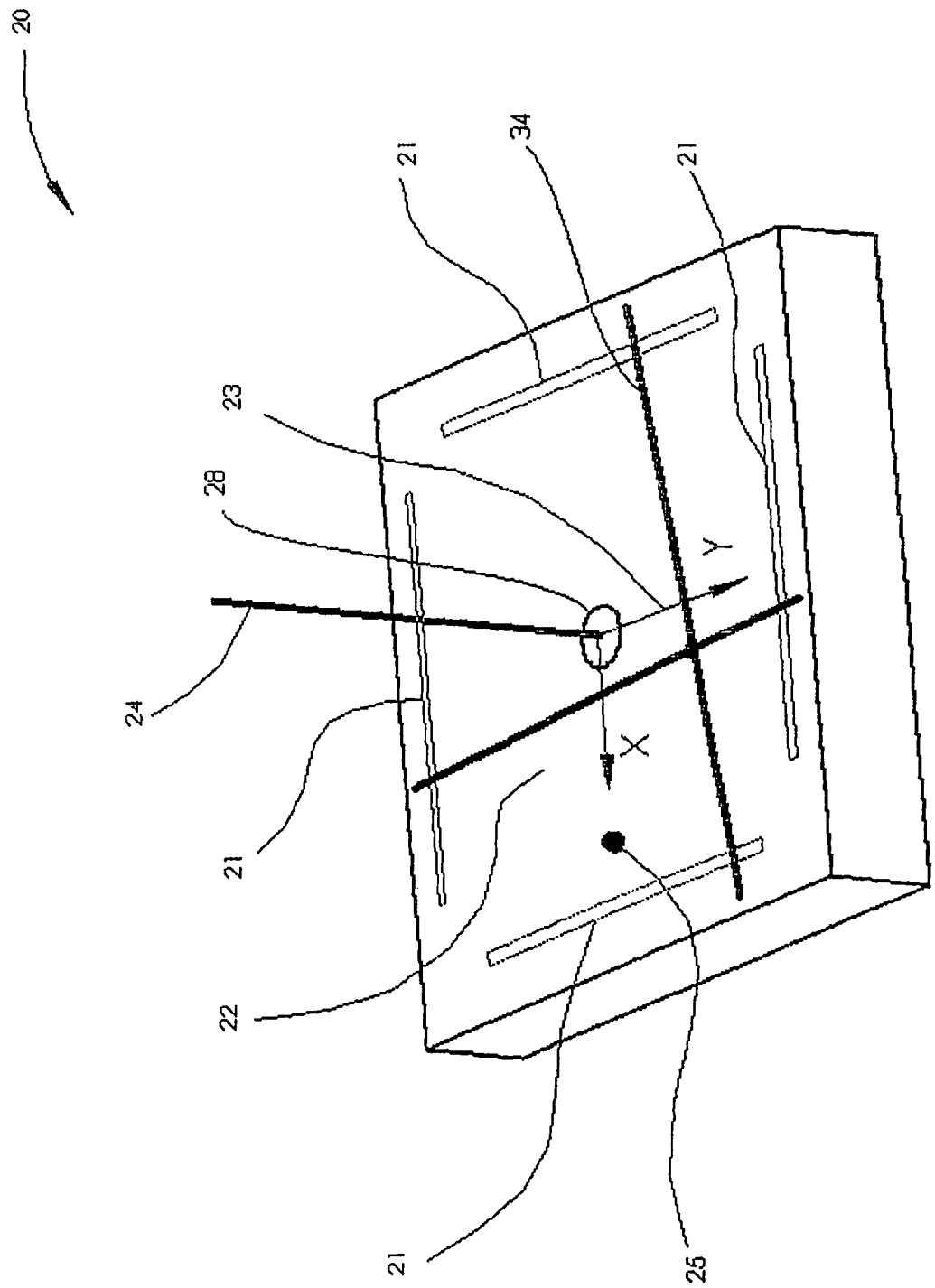
FIG. 4 is a more detailed drawing of the receiver, a component of the small-range measurement device that is part of the present invention.

The receiver 20 (see FIG. 4) consists primarily of a flat measurement surface, 22 including 4 linear array sensors 21 mounted in the form of a square to one another. Each linear array sensor 21 consists of a linear row of integrating photo-sensing pixels measuring incident light exposure. Therefore, the laser light coming from the emitter 30 can be directed such that when it hits the flat surface 22 of the receiver, each one of both legs of the resulting laser cross 34 will intersect with two parallel linear array sensors 21 yielding for each sensor 21 a group of pixels (one pixel or a few adjacent to one another) being exposed to the laser light.

The receiver, 20 is connected to a CPU 50 allowing the obtained raw measurements (i.e. the position of the pixels exposed to laser light for each of the four linear array sensors) to be collected and then further processed. Indeed the position of the exposed pixels for each linear array sensor 21 allows calculation of the location of both legs of the resulting laser cross 34 relative to the receiver frame 23. This in turn allows the two-dimensional position (x, y) of the intersecting point between the imaginary laser line 33 and the receiver's flat measurement surface 22 to be obtained through straightforward calculation.

The calibration robot program, not shown, associated with the robot 10 instructs the robot 10 to move, thus moving the end-effector 11 to a plurality of locations in space, known as the "calibration positions". The primary constraint for selecting these calibration positions, either manually on the fly or through simulation ahead of time, is that the laser cross 34 projected on the receiver's flat measurement surface 22 intersects with all four linear array sensors 21 (i.e. each one of both legs of the laser cross 34 intersects with two parallel linear array sensors 21) yielding four raw measurement data per calibration point. Additional considerations are that the robot 10 exercises as much as possible all parameters to be calibrated and that the laser line 33 hits the receiver's flat measurement surface 22 at different enough orientations.

Once all calibrations points have been measured the CPU 50 connected to the receiver 20 starts by calculating the (x, y) position for each measured calibration position. Then the calibration software loaded on the CPU 50 continues with deriving the robot positions, using some standard forward and reverse kinematic techniques, from the calibration robot program. As a result, for each of the calibration points there will be a set of joint angles (i.e. one positional value per robot axis) and its corresponding set of measured (x, y) positions. From there, the calibration software is capable of calculating a first approximation of the location of the receiver 20 relative to the robot 10. The location of the emitter 30, on the end-effector 11 can either be approximated as well through the calibration software, or be derived more directly from the approximate TCP values (if some were utilized, for facilitating the teach process for example, as explained below).

Using the approximate location of the receiver 20 and of the emitter 30 as well as the known starting values for the robot parameters (i.e. typically the nominal "per-design" dimensions), the calibration software calculates for each calibration point (i.e. for each set of calculated robot joint angles) the corresponding (x', y') position that should have been measured by the receiver 20 if these approximate and starting values were indeed true. By comparing the deviation between this calculated set of (x', y') positions and the corresponding set of actually measured (x, y) positions, the calibration software can calculate through a standard minimization method a more accurate set of parameters for the robot 10 as well as for the location of the receiver 20 and of the emitter 30.

This process is repeated several times iteratively until no further improvement in the calculated set of parameters can be obtained. This final set of kinematic parameters is then logically considered to be as close as possible to the "true" set of parameters. With this new set of kinematic parameters, the robot 10 and its end-effector 11 can now be corrected, using standard compensation techniques (either through "filtering" or through "direct entry" for example, depending on availability), in order to achieve, as closely as possible, the desired position and orientation in space.

There are a few other critical issues to consider in order to successfully execute the calibration process as outlined above. One important issue relates to properly defining the orientation of the receiver 20 with respect to the robot 10. While the (x, y, z) position of the receiver can be mathematically approximated based on the acquired measurements, it is much more difficult to do so for the receiver's orientation due to the inherently small range of the acquired measurements (even if that can be done later, i.e. during the calibration iteration process itself, once an appropriate starting approximation has been provided).

One straightforward method would be, of course, to manually enter the orientation of the receiver 10. However, from a practical usage point of view, this often leads regularly skilled operators to make undesirable mistakes that can be difficult to track later on. Therefore, a more automatic procedure for defining the receiver's orientation is highly desirable. For that purpose the receiver 20 is fitted with an additional laser 28 projecting a linear light beam 24 that is perpendicular to the receiver's flat measurement surface 22. An additional reference point 25 is also positioned strategically on the same receiver's flat measurement surface 22.

The laser beam 24 and the reference point 25 can be used jointly in various ways to uniquely define, even if only approximately, the 3DOF orientation of the receiver 20. For example, the orientation of the axis of the laser beam 24, can be determined uniquely by moving and orienting the robot 10 in a first position such that the laser line 33 of the emitter 30 is lined up, as closely as possible with the laser beam 24 of the receiver 20. While maintaining the same robot orientation, the robot can then be moved to a second position so that the laser line 33 of the emitter 30 hits the reference point 25 of the flat measurement surface 22 of the receiver 20.

With these two positions, the 3DOF orientation of the receiver 20 can then be uniquely defined. This of course assumes the compound orientation of all axes of the robot 10 and the orientation of the emitter 30 relative to the robot 10 to be known, if only approximately at the start of the calibration process. The orientation of the receiver 20 can then be further refined as part of the regular calibration iteration, not only by further also refining the compound orientation of all robot axes of the emitter, but also through regular minimization based on the measurement deviations.

Other methods for determining the 3DOF orientation of the receiver 20 are possible of course, without using the laser beam, 24. For example, the 3DOF orientation of the orientation of the receiver 20 could be determined uniquely by moving and orienting the robot 10 in a position such that the laser line 33 of the emitter 30 is roughly perpendicular to the receiver's flat measurement surface 22 and such that the orientation of the laser cross 34, (around the laser line 33) is in a unique relation with respect to the orientation of the linear array sensors 21, (as determined by the reference point 25).

Furthermore, if the receiver 20 is located in a known relation to a fixture 12 then the location of that fixture 12 can be obtained as part of the regular calibration process. One way to achieve this is to place the receiver 20 in a known (x, y, z) position as well as a known 3DOF orientation relative to the fixture 12. That way, only one single location of the receiver 20 on the fixture 12 would be required. However, since it might be practically difficult to guarantee a known orientation of the receiver 20 relative to the fixture, it might be easier instead to locate the receiver 20 to a minimum of three known (x, y, z) positions on the fixture 12 without concern for the receiver's orientation relative to the fixture. In that case a standard alignment procedure can be executed between the calibrated receiver's (x, y, z) positions and the corresponding known (x, y, z) positions in the fixture's coordinate frame, providing the 6DOF transformation matrix between the robot's frame and the fixture's frame.

Figure 5:
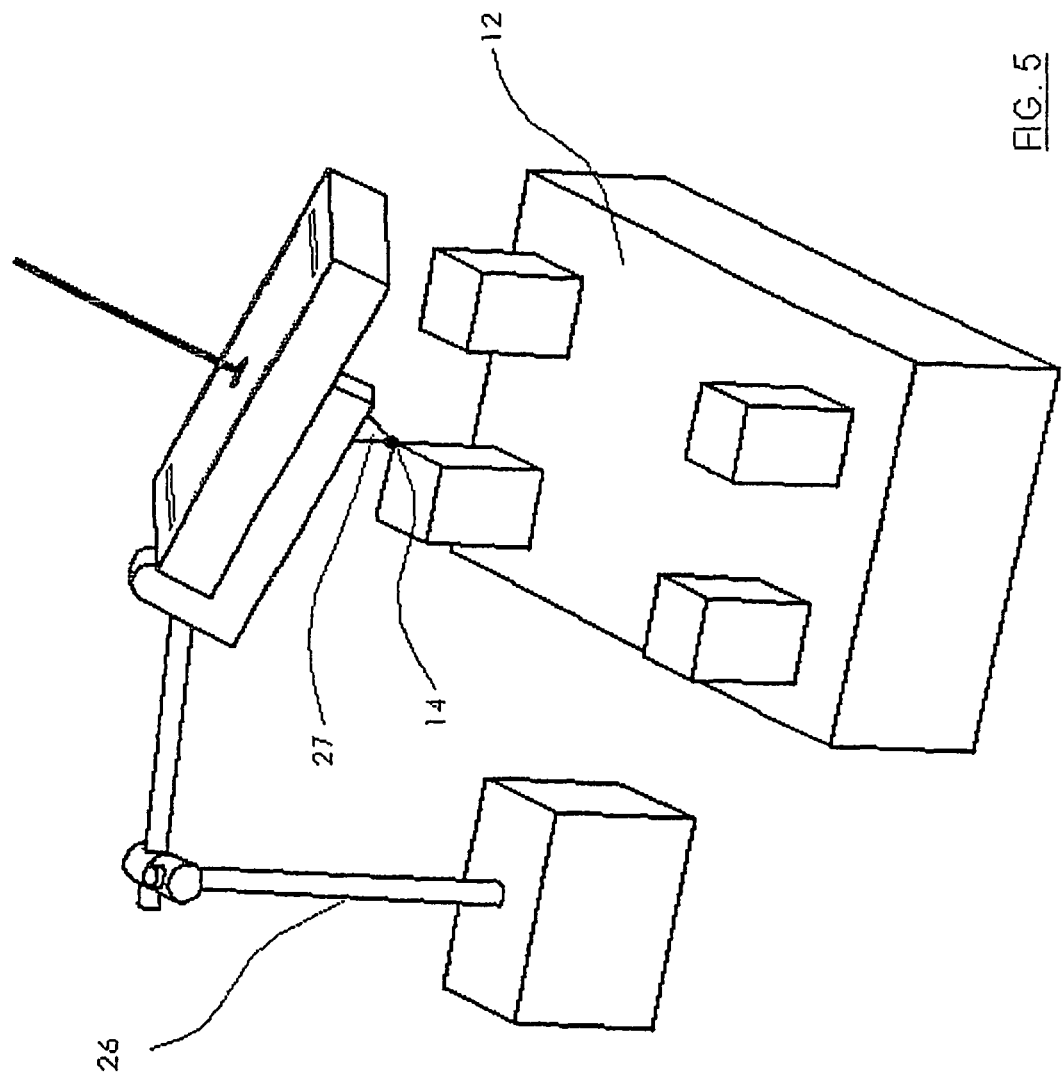
FIG. 5 illustrates a practical arrangement of how the receiver can conveniently be located on the fixture.

The latter method thus indeed allows for essentially any "random" orientation of the receiver 20 in the various locations on the fixture 12. This in turn is made easier if, as explained before, the orientation of the receiver 20 can be determined automatically instead of having to be entered manually (requiring a known and therefore "straightforward" orientation instead of a "random" one). A further advantage of the automatic determination of the receiver's orientation, is the ability to use a standard dial gauge holder 26 (see FIG. 5), conveniently allowing a pointer 27 mounted on the receiver 20 to be brought in contact with the desired point 14 on the fixture 12. That way, the receiver 20 can be located precisely where desired, even on mechanically complex fixtures, without concern about its orientation.

Of course, other configurations different than those mentioned above are possible for calibration of the fixture 12 using one or multiple receivers 20. For example two distinct receiver locations only are possible, as long as one additional orientation can be determined otherwise (either already known or determined through some orientation of the receivers themselves). Further, multiple receivers 20 could be used simultaneously, eliminating the need for moving the receiver 20 from one location to another. This can be especially useful in an automatic recovery calibration process. Moreover, other adaptors than the pointer, 27, mentioned above can be used, such as a cylindrical adaptor to fit in matching holes on the fixture 12 or a so-called "corner" adaptor to be clamped on well defined corners of the fixture, etc.

As mentioned above, the calibration of the emitter 30 can also be used to define the desired TCP of the end-effector 11. This can be achieved by having a known relation between the emitter's laser line 33 and the desired TCP. Obviously, since a line is described in space with only 4 degrees of freedom, it cannot uniquely define a 6DOF TCP. Therefore, one option is to have another emitter's laser line 33, different in orientation from the previous one (ideally at 90 degrees from the previous laser line) also at a known relation to the desired TCP. The known location of these two different laser lines allows the unique definition of a full 6DOF TCP. These two different laser lines are not required simultaneously, as long as during the calibration process the orientation of the laser line switches from one to another, whether while pointing to a single location of the receiver 20 or to different receiver locations consecutively.

The following mechanical arrangement (see FIG. 3) for the emitter 30 provides a convenient way for practically achieving the above. It consists principally of a cylindrical holder 36 around axis 37 of which the emitter's main body 35 holding the pair of lasers 31 can swivel. The cylindrical holder 36 has appropriate dimensions allowing it to fit on a wide variety of standard tool tips of multiple sizes, on which it can be held tightly with the help of regular setscrews. The pointer 38 located at the bottom of the cylindrical holder 36 should butt against the point of the tool tip on the end-effector 11 that is intended to be calibrated as the TCP.

By design the laser line 33 virtually intersects with the tip of the pointer, 38 no matter what the orientation of the emitter's main body 35 is around the swiveling axis 37 of the cylindrical holder 36. A pin 40 connected through a spring with the emitter's main body 35 and constantly pressing against a corresponding grooved disk 39 placed rigidly on the cylindrical holder 36 provides for a quick and repeatable re-orientation of the emitter's main body 35 relative to the cylindrical holder 36 in 45 degrees increments. High mechanical repeatability in the re-orientation process of the emitter's main body, 35, is critical as any small deviation at the emitter assembly 30 can easily translate to large measurement errors with the receiver 20. That way the operator can easily switch back between different emitter orientations without loss of accuracy in the resulting calibration process.

In some cases, the TCP does not need to be defined in all 6 degrees of freedom. A typical example would be the TCP required for a water jet gun (i.e. for a water jet cutting application), where neither the rotation around the water jet's axis, nor the distance from the water jet nozzle to the part are as critical as the other degrees of freedom for that particular TCP. In that instance, a single laser line 33 oriented along the water jet's axis is sufficient to calibrate the critical TCP parameters. Furthermore, designs other than the cylindrical holder 36 described above might work better for specific applications (such as a screw-in emitter assembly for an arc-weld application, for example).

Even further deviations from the above design for the emitter assembly, 30 are possible. One such design could include an offset between the laser lines 33 at different orientations. Another design might include two separate and simultaneous laser lines 33 fixedly located at a different orientation from one another. For purposes where calibration of a single TCP is not required especially, one or multiple laser lines 33 could be fixed independently, permanently or temporarily, on the end-effector 11.

In any case, the calibration software is capable of handling a variety of configurations of the emitter 30; considering one or multiple orientations of the laser line, 33; considering intersecting or offset laser lines; considering precise or approximate laser line orientations; etc. When calibrating a 6DOF TCP in particular, the user can, for example, determine if the multiple orientations of the laser line 33 are all approximate; or if one in particular is to accurately coincide with a specific TCP axis; or if all of them are considered to be accurately known relative to the TCP, etc.

As mentioned above, the location of the emitter 30 relative to the robot 10 needs to be approximated at some point for the calibration process to proceed, whether or not its location coincides with the intended TCP. One way is to mathematically approximate the emitter's location (i.e. position and orientation) from the acquired measurements with the receiver 20 similarly to what's done for the (x, y, z) position of the receiver 20. However, with the emitter 30, as detailed above, being designed to help conveniently calibrate the TCP, a preferred method would be to teach a temporary TCP (using, for example, any of the quick methods readily available on most industrial robot controllers 15) roughly at the emitter's location with that TCP's x-axis pointing along the first laser line 33 and its y-axis pointing along the second laser line rotated at 90 degrees relative to the first one. Not only does this readily yield a good approximation of the location of both laser lines 33 but it also dramatically facilitates the manual teaching process (if applicable) of the calibration points.

Some robotic applications involve the use of a so-called "positioner" or an "external axes". In either case, supplementary axes of motion are added to the regular robot axes. A positioner includes one or more axes, whether translational or rotational, and typically holds the part 13 the same way a regular fixture 12 would, except that it provides additional motion of the part in synchronization with the robot's motion. In that case, the receiver 20 can be connected to the positioner similarly to the way it is connected to the fixture, as described above. The calibration points should then be taught not only by moving the robot 10 but also by moving the positioner at the same time. The calibration software then includes the necessary mathematics to calibrate the robot's as well as the positioner's kinematic parameters.

In the case of external axes, or "track", the robot's base is allowed to move along one or more additional axes of motion (instead of being fixed in space), while the part 13 is still held rigidly in a fixture 12. The method for fixing the receiver 20, to the fixture 12 does therefore not deviate from the explanation above. However, the calibration points should, in this case also, be taught not only by moving the robot 10 but also by moving the external axes at the same time. Here too then, the calibration software should include the necessary mathematics to calibrate the robot's as well as the external axes' kinematic parameters.

Figure 6:
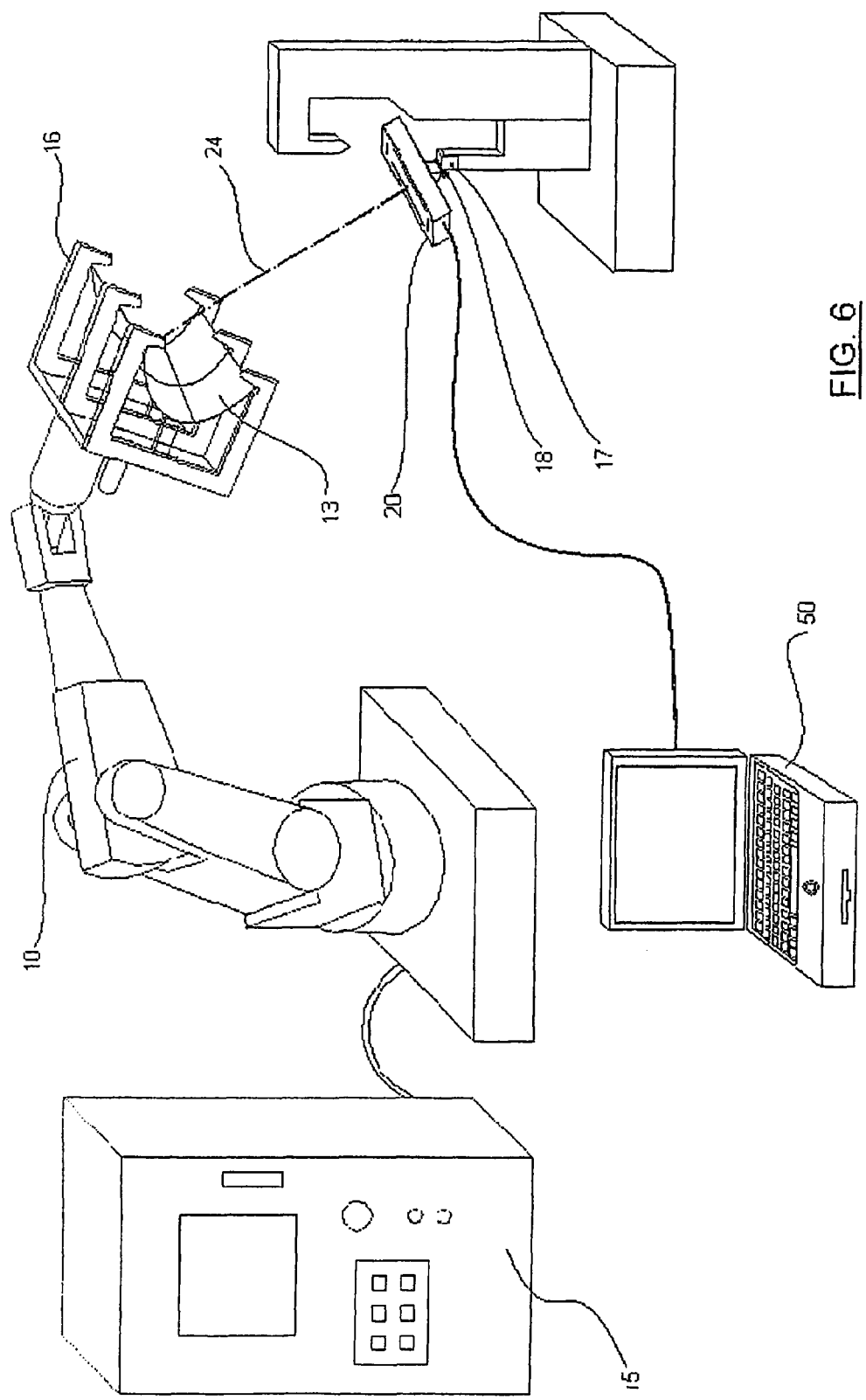
FIG. 6 is a diagrammatic representation of the present invention within a typical fixed TCP robot application.

Many robotic applications involve the use of a certain tool tip to perform a specific task on a certain part. In such a process, the tool tip is defined as a specific 6DOF location, i.e. the TCP that should be moved around the part. The robotic applications detailed above are all of the "moving TCP" type so far, in that the TCP is located on the end-effector 11 which in turn is moved by the robot 10 while the part 13 is located rigidly within a fixture 12 or alternatively in a positioner. That configuration is essentially reversed in the case of a "fixed TCP" or also called "pedestal" application (see FIG. 6). The part 13 is held rigidly in a gripper 16, itself in turn mounted on the robot 10 while the TCP 17 is defined on a certain tool located fixedly this time in space. In this case, the robot 10 is programmed to move the part 13 it is holding with the gripper 16 at and around the fixed TCP.

With "fixed TCP" applications, an appropriate adaptor 18 can be mounted on the receiver 20 allowing it to be conveniently oriented while located in a known relation to the desired fixed TCP of the tool located in front of the robot 10. The emitter 30 should then be located on the gripper 16 mounted on the robot 10. However, contrary to a standard "moving TCP" type end-effector, a gripper does not have a specific physical point which one would naturally desire to coincide with the TCP (such as the tip of a spot weld gun, or a water jet nozzle, for example). Still, a mathematical 6DOF moving TCP (e.g. coinciding with the coordinate frame of the part 13 it is holding) should typically be defined for the gripper 16 in order to facilitate robot programming, similarly to defining the transformation between the robot 10 and the fixture 12 in the case of "moving TCP" applications, as described above.

For that purpose, one option is to connect the emitter 30 to at least three (x, y, z) positions that are known relative to the desired coordinate frame of the gripper 16. Three or more corresponding local TCP's can then be defined accordingly using the regular calibration procedure, as explained above. The calibration software indeed allows for a unique set of robot kinematic parameters of multiple TCP's to be calibrated based on one or multiple receiver locations. However, the need to calibrate three or more local TCP's can make this method more time-consuming.

Another method would consist of locating the emitter 30 in one known position relative to the gripper 16, not only in terms of the (x, y, z) position, but also in terms of its orientation. In that case, the first laser line 33 of the emitter 30 could be aligned in some known relation to the gripper's frame, while the second laser line (e.g. at 90 degrees from the first laser line) would be aligned in some other known relation to the gripper's frame. Thus a single 6DOF TCP calibration would uniquely define the transformation between the robot's flange frame and the desired gripper's frame. Of course, any combination between using a single 6DOF TCP location compared to using a minimum of three local (x, y, z) TCP positions is possible.

The availability of the laser beam 24 on the receiver 20 allows for an even more convenient method though. The emitter 30 is placed in a single location anywhere on the gripper 16 i.e. even at some unknown relation to the gripper's frame. Then, the regular calibration process is performed, including the automatic definition of the receiver's orientation based on the receiver's laser beam, as described above. As part of that calibration process, not only are the kinematic parameters of the robot 10 the location (although useless further on) of the emitter 30 and the location of the fixed TCP 17 defined, but so is also the orientation of the receiver's laser beam 24.

As a result, the axis defined by the receiver's laser beam 24 can actually be used to define the 6DOF transformation between the coordinate frame of the gripper 16 and the coordinate frame of the flange of the robot, 10. This is achieved simply by moving the robot, 10 such that at least three known (x, y, z) positions on the gripper 16 intersect anywhere along the receiver's laser beam, 24. Typically, each one of these (x, y, z) positions does not need to be visited by the robot more than twice, each time with a different gripper orientation. The calibration software then uses those recorded robot positions together with the corresponding (x, y, z) positions to automatically calibrate the gripper's moving TCP.

As an additional advantage, instead of using known (x, y, z) positions on the gripper 16, as described above this method also allows the use of known (x, y, z) positions right on the part itself 13. Practically spoken, this is quite useful since the gripper 16 is often built "on the fly" simply to fit the actual part, thus with no accurate information about any specific (x, y, z) points on the gripper. Instead, reasonably accurate CAD data of several points is often available for the part itself. Of course, the calibration accuracy of the method proposed depends on the accuracy of the visual teaching on the part 13 relative to the receiver's laser beam 24, but that is often in line with the accuracy level of the provided CAD data for the part anyway.

In robotic assembly applications, the gripper 16 mounted on the robot 10 is programmed to move a certain part into a mating fixture. In that case, there is not a single physical point that could naturally be chosen as the TCP, neither on the gripper 16 (as a "moving TCP"), nor on the fixture 12 (as a "fixed TCP"). Consequently, calibration of a robotic assembly application typically requires location of the receiver 20 at a minimum of three (x, y, z) positions on the fixture, 12, as well as location of the emitter 30 at a minimum of three (x, y, z) positions on the gripper 16. Alternatively, especially for lower-accuracy assembly applications, a calibration method using the receiver's laser beam 24, similar to the method described above can be employed.

Obviously, most of what is described above can be executed with the role of the emitter 30 and the receiver 20 reversed. Practical considerations though would tend to favor mounting the emitter 30 on the robot 10 since the required power can be provided in the form of a battery pack, instead of necessitating cabling running along the moving robot 10. On the contrary, the cabling to the receiver 20 does not only carry power but also data information that needs to be exchanged with the CPU 50. Therefore, unless some convenient wireless communication can be provided, it is generally less cumbersome to run the necessary cabling for the receiver 20 along a static fixture 12 or tool, than it is along a moving robot.

Figure 7:
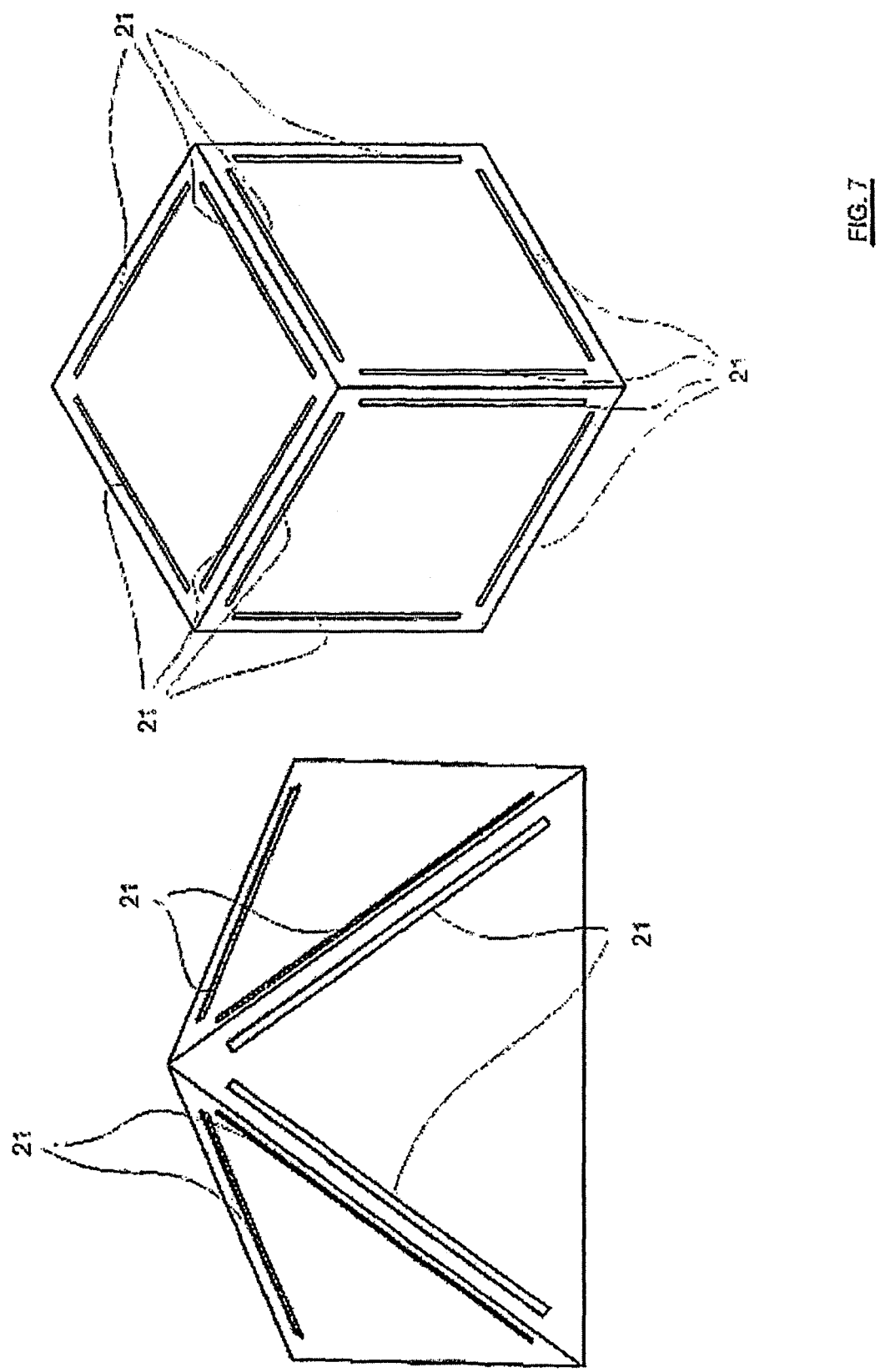
FIG. 7 is a diagrammatic representation of another preferred embodiment of the present invention with the linear array sensors arranged in a 3D configuration.

Other embodiments of the present invention are obviously possible. One alternative is to replace the linear array sensors, 21 on the receiver 20 with any other way to sense the position of the laser light hitting the receiver 20, whether in one or multiple dimensions. For example, a so-called two-dimensional "position-sensing detector" could be used instead, or even just one single one-dimensional linear array sensor, without deviating from the calibration concept described above. Another embodiment could still rely on the use of linear array sensors, but would have them mounted in a different arrangement, for example with linear array sensors 21 mounted orthogonally to one another, on different surfaces even, therefore allowing the 3D (or 6DOF) position of the receiver 20 to be directly measured (see examples on FIG. 7).

The emitter 30 could hold a variety of different laser configurations. One obvious alternative would be to replace the pair of intersecting lasers 31 with a single laser emitting directly two crossing planes. The embodiment described above is preferred primarily because easy availability, and increased power, and therefore increased maximum distance to the receiver 20 of the resulting laser cross 34. Other embodiments of the emitter 30 are typically also depending on the embodiment of the receiver 20. For example, if the receiver 20 is in the form of a two-dimensional "position-sensing detector", the laser of the emitter 30 could be in the form of a single laser emitting a linear beam, this arrangement otherwise providing two-dimensional measurements similar to those described above.

There are several advantages though for using the first embodiment of this invention. First of all, a set of four one-dimensional linear array sensors is typically substantially less costly than one two-dimensional "position-sensing detector". More importantly, linear array sensors come in large sizes, allowing the measurement range of the receiver to be substantially larger than the size of a "position-sensing detector". This in turn allows for easier teaching of the calibration points. Also, in case of recovery calibration, lesser re-teaching of the calibration points is required due to small modifications of the robot 10, the end-effector 11, or the fixture 12 (e.g. following a crash or a replacement).

Other embodiments of the emitter 30 include multiple lasers, even more than two, eliminating the need to change orientation of the laser line 33 during the calibration process. Three laser planes 32 might even suffice, with for example a first plane being intersected perpendicularly by two other planes, these last two at a certain angle from one another. Another embodiment could include two pairs of laser planes 32 as described in the primary embodiment above, with both respective laser lines 33 at 90 degrees for example from one another.

The proposed emitter 30 arrangement described above with a single pair of laser planes 32 has several advantages. Besides the obvious lesser price of two lasers there is also the advantage of reduced weight and size that makes it therefore easier to install while adding minimal weight to the overall weight of the end-effector 11. More important though is the convenience of having to deal with a single laser line 33, at one time, therefore avoiding any confusion and minimizing any possible eye exposure to the laser. Yet another embodiment of the emitter 30 would include one or multiple laser with a light pattern other than a beam or a plane in conjunction with a matching receiver, possibly talking advantage of such pattern to effectively measure in one or more additional degrees of freedom.

Furthermore, in the first described embodiment, the laser beam 24 on the receiver 20 used primarily to help defining the orientation of the receiver 20 could be replaced with any other appropriate device, even some mechanical pointers. The proposed laser beam 24 has the advantage though of proposing a virtual pointer of a changing length with a substantial reach. In addition to this laser beam 24, or a replacement for it, some medium-range or large-range sensor, such as a laser distance sensor for example, could be provided, allowing at least one additional degree of freedom, for example in a direction perpendicular to the receiver's flat measurement surface 22 or in any other direction.

Moreover, in the primary embodiment of the present invention, the orientation of both laser planes 32 relative to the receiver's flat measurement surface 22 as measured with the linear array sensors 21, provides another measurement degree of freedom, in addition to the (x, y) measurement indicated above, representing orientation around the laser line 33. This additional measurement degree of freedom thus provides three equations instead of just two, as considered above, for the calibration minimization process, while requiring just one more emitter parameter to be calibrated, i.e. the laser line's orientation. This in turn allows for a lesser amount of calibration points.

In that case, the measurement input data for the calibration minimization scheme described above is no longer the (indirectly) measured (x, y) positions, but rather the "raw" measurements obtained directly at each one of the four linear array sensors 21. As a result, the calibration software is able to determine the location of the laser line 33 relative to the robot flange in 5DOF's, the only missing DOF then being the "origin" of that line. This in turn allows the TCP's orientation to be fully determined through a single laser line 33 while only one translation of the TCP remains to be determined. In another possible embodiment of the emitter 30 the addition of a separate sensor (e.g. a laser 1D-distance sensor) essentially measuring the distance along the laser line 33 would then allow the complete 6DOF determination of the TCP without the need for an additional orientation of the laser line, 33.

In order to process the measurement data into measured (x, y) positions (as described above), valid measurements of all four linear array sensors are required (to determine the intersecting point of both legs of the laser cross, 34). Therefore, another benefit of performing calibration directly with the linear array sensor measurements is that not all four measurements are systematically required. This is particularly useful in the case of recovery calibration, where it is likely, in some robot positions at least following a substantial crash, that both legs of the laser cross 34 might no longer hit the receiver 20 resulting in less than four linear array sensor measurements in such cases. This allows the calibration to still occur, considering even those robot positions not yielding all linear array sensor measurements.

The small-range measurement device generally described herein allows for a wide variety of applications beyond just robot cell calibration as explained above (even outside of the field of robotics as such). As an example, this measurement device could be used for robot (or other vehicle) guidance where one or more emitters would be pointing to one or more corresponding receivers strategically positioned, while approaching a certain precise position. Such guidance could in certain cases either replace or complement the need for calibration, depending primarily on cost (how many emitters/receivers are required) as well as accessibility (how "easily" can the emitter(s) hit the receiver(s) while moving into the desired position). In that last respect, the present invention offers the advantage of being relatively small and easy to reach even at higher distances (due to the laser beam's length).

Having described my invention, however, many modifications, including but not limited to measurement devices (emitter and receiver), calibration methods and software, computers, and robots thereto will become apparent to those of skill in the art to which it pertains without deviation from the spirit of the invention as defined by the scope of the appended claims.

The invention claimed is:

1. A measurement device for calibrating a robot-cell, said robot-cell comprising a robot and at least one end-effector carried by said robot, and said measurement device comprising an emitter and a receiver physically separated from one another; wherein said emitter is mounted on said end-effector, and said receiver is mounted in the proximity of said robot; wherein said emitter produces at least two laser light planes at a constant relation relative to one another of approximately ninety degrees, the intersection of both said laser light planes forming a virtual laser line in a fixed relation to said emitter; wherein said receiver comprises four linear array sensors mounted along the perimeter of a square forming a flat measurement surface; wherein said emitter is placed at any position and orientation relative to said receiver, as long as at least one said laser light plane intersects with at least one said linear array sensor; and wherein said intersection of said laser light planes with said linear array sensors delivers up to four one-dimensional measurements, allowing calculation of the point of intersection between said virtual laser line and said flat measurement surface.

2. The measurement device as described in claim 1, wherein said emitter includes at least one additional sensor providing at least 1-dimensional measurements.

3. The measurement device as described in claim 1, wherein said receiver includes a laser beam used for reference purposes.

4. The measurement device as described in claim 1, wherein said linear array sensors of said receiver are mounted on different surfaces allowing for the measurement of said receiver's location in at least 3 dimensions.

5. The measurement device as described in claim 1, wherein said emitter includes a means for said virtual laser line to intersect with a desired physical point.

6. The measurement device as described in claim 5, wherein said emitter includes a means to modify the orientation of said virtual laser line, while still intersecting at a single desired physical point.

7. A method for calibrating a robot-cell with a measurement device comprising at least one emitter and at least one receiver physically separated from one another; said robot-cell comprising a robot and at least one end-effector carried by said robot; said emitter producing at least two laser light planes at a constant relation relative to one another of approximately ninety degrees, the intersection of both said laser light planes forming a virtual laser line in a fixed relation to said emitter; said receiver comprising four linear array sensors mounted along the perimeter of a square forming a flat measurement surface; said emitter placed at any position and orientation relative to said receiver, as long as at least one said laser light plane intersects with at least one said linear array sensor; said intersection of said laser light planes with said linear array sensors delivering up to four one-dimensional measurements allowing calculation of the point of intersection between said virtual laser line and said flat measurement surface; said method comprising the following steps:

Step 1: Attaching said emitter to said end-effector;
Step 2: Fixing said receiver in the proximity of said robot;
Step 3: Programming said robot in such a manner that said emitter strikes said receiver at a plurality of positions and configurations, delivering a sufficient amount of said one-dimensional measurements as input for the calibration procedure.
Step 4: Executing said calibration procedure which, based on said one-dimensional measurements at said plurality of said robot positions and configurations, calculates the location of said receiver relative to said robot, the location of said emitter relative to said end-effector, as well as the accurate parameters of said robot.

8. The method for calibrating a robot-cell as described in claim 7, wherein said robot-cell also comprises at least one external axis, wherein step 3 of said method also includes programming said external axis to said plurality of positions and configurations, and wherein step 4 of said method also includes calibration of said external axis.

9. The method for calibrating a robot-cell as described in claim 7, wherein said robot-cell also comprises at least one fixture, wherein step 2 of said method consists of attaching said receiver in a known location relative to said fixture, and wherein step 4 of said method also includes calibration of said fixture.

10. The method for calibrating a robot-cell as described in claim 7, wherein said robot-cell also comprises at least one positioner, wherein step 2 of said method consists of attaching said receiver to said positioner, wherein step 3 of said method also includes programming said positioner to said plurality of positions and configurations, and wherein step 4 of said method also includes calibration of said positioner.

11. The method for calibrating a robot-cell as described in claim 7, wherein said method is repeated periodically for recovery purposes.

12. The method for calibrating a robot-cell as described in claim 7, wherein the location of said emitter and said receiver can be reversed.

13. The method for calibrating a robot-cell as described in claim 7, wherein step 1 of said method is executed such that the location of said emitter is known relative to the desired Tool Center Point of said end-effector, and wherein step 4 of said method includes calibration of said Tool Center Point.

* * * * *